United States Patent [19]

Barényi

[11] 3,840,259
[45] Oct. 8, 1974

[54] BUMPER ARRANGEMENT

[75] Inventor: Béla Barényi, Maichingen, Germany

[73] Assignee: Daimler-Benz Aktiengesellschaft, Stuttgart, Germany

[22] Filed: Sept. 2, 1971

[21] Appl. No.: 177,364

[30] Foreign Application Priority Data
Sept. 2, 1970 Germany.............................. 2043525

[52] U.S. Cl...................... 293/70, 293/63, 188/1 C
[51] Int. Cl........................................... B60r 19/08
[58] Field of Search ............. 293/1, DIG. 3, 63, 70, 293/89; 213/1 A; 188/1 C

[56] References Cited
UNITED STATES PATENTS

| | | |
|---|---|---|
| 2,251,347 | 8/1941 | Williams et al...................... 213/221 |
| 2,997,325 | 8/1961 | Peterson................................ 293/1 |
| 3,412,628 | 11/1968 | De Gain................................ 74/492 |
| 3,499,661 | 3/1970 | Rowe, Jr.............................. 280/106 |
| 3,663,034 | 5/1972 | Barenyi et al........................ 293/63 |
| 3,663,048 | 5/1972 | Zimmerle............................. 293/84 |

Primary Examiner—M. Henson Wood, Jr.
Assistant Examiner—Robert Saifer
Attorney, Agent, or Firm—Craig & Antonelli

[57] ABSTRACT

A bumper arrangement for vehicles, especially motor vehicles in which the front and/or rear bumper are mounted at the respective chassis end by way of bumper mounting means whereby at least two elastically and/or plastically effective deformation members are interconnected as bumper mounting means between the respective bumper and the form-rigid passenger cell.

62 Claims, 9 Drawing Figures

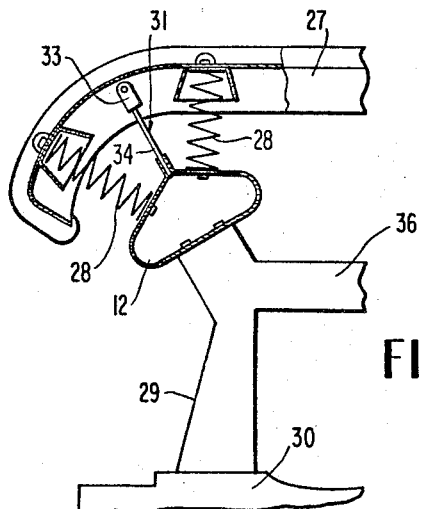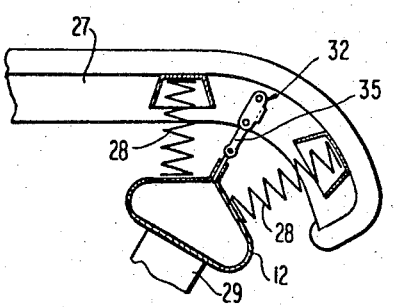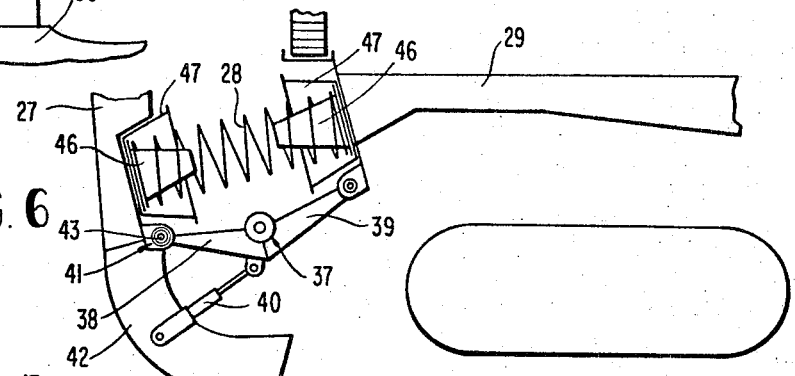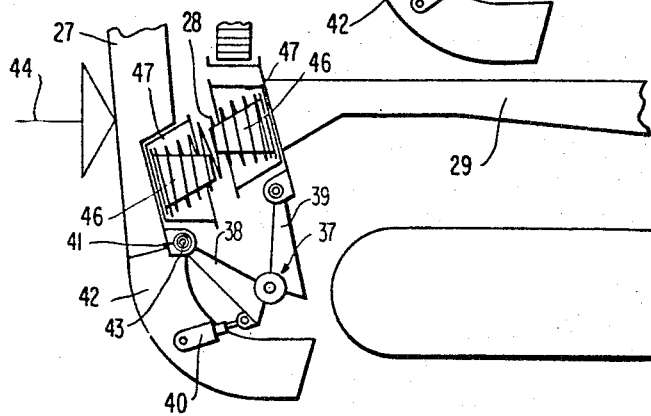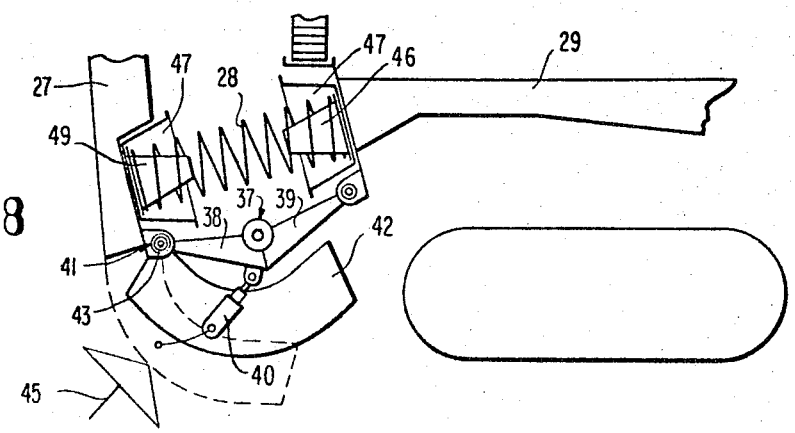

BUMPER ARRANGEMENT

The present invention relates to a bumper arrangement for vehicles, especially for motor vehicles, in which the front and/or rear bumper or bumpers is or are retained by way of bumper mountings at the respective chassis end of the motor vehicle.

A bumper of the aforementioned type has been described in the German Pat. No. 976,784. In this prior art bumper arrangement, one bumper mounting each is disposed at the forward chassis end of the motor vehicle, extending shortly in front of the chassis, to the left and the right of the vertical center longitudinal plane, whereby the bumper mountings are connected with an absorber bar extending transversely in front of the chassis at which is arranged the three-partitie bumper by means of threaded connection. The advantage of this prior art bumper arrangement resides in that the three-partite bumper is secured directly by a threaded connection at the chassis end by means of buffers together with the absorber bar by way of the bumper mounting members so that the bumper fastening can be realized with only two or four bolts. However, it is disadvantageous in this prior art construction that the bumper and absorber bar are arranged directly in front of the chassis end so that forces acting on the vehicle as a result of smaller impacts are introduced directly into the chassis of the vehicle and damage the same depending on the magnitude of the force. Therebeyond there exists the disadvantage that the bumper parts secured at the absorbing bar in an unprotected manner are dented already by small impacts and considerably deteriorate the appearance of the vehicle.

Bumper arrangements are described in the French Pat. Nos. 1,231,505 and 1,259,278 in which the bumper body is constructed as profile element open in the direction toward the vehicle interior and, forming with the end wall or the radiator apron a closed hollow space, are detachably secured at the vehicle body either by way of flanges or directly. Though the resistance moment is considerably increased by the profiling of the bumper body and therewith a rigid bumper is achieved notwithstanding slight material expenditures, this bumper is not able to absorb any impacts without being damaged itself and additionally larger accident forces are introduced directly into the vehicle body without reduction since a deformation path necessary for the dissipation of the accident energy is not provided. It is additionally disadvantageous that in the course of the deformation of the bumpers described in the French patents the connecting flanges are bent at the same time so that an exchange of a deformed bumper and a replacement with a new bumper is not possible without difficulty.

It is also known by the German Pat. No. 854,157 to manufacture a motor vehicle of cellular type construction whereby less deformation-rigid end sections are connected to the rigid passenger center cell. Arcuate end portions constructed as bumpers are flangedly connected to the outer end sections, by means of which the impact forces are introduced directly into the easily deformable end sections. This bumper- and end-cell arrangement offers the advantage in case of violent frontal collisions that the passengers present in the passenger center cell are relatively well protected. However, the disadvantage of this prior art resides in that the vehicle is already heavily damaged in case of smaller and medium impacts by reason of the deformation of the end sections whereby under certain circumstances also the radiator and the engine of the vehicle can be seriously affected.

The present invention is concerned with the task to avoid the disadvantages of the prior art bumper arrangements for vehicles and to provide a bumper arrangement which is so secured at the vehicle with the use of few structural parts and a simple construction that small impacts impinging on the bumper can be absorbed without damaging the bumper or the vehicle and larger accident forces can be absorbed without damaging the passenger space.

The underlying problems are solved according to the present invention in that at least two elastically and/or plastically acting deformation members are interconnected as bumper mountings between the form rigid bumper or bumpers and the form-rigid passenger cell. Advantageously, the deformation members are thereby series-connected and are provided preferably in the same arrangement symmetrically to the vehicle longitudinal axis on both sides at the respective vehicle end. In order that small impacts can be absorbed by the bumper, for example, during parking, it is appropriate if the elastically effective deformation members are arranged within the area of the bumper and the plastically deformably effective deformation members within the area of the form-rigid center cell. Only after overcoming the spring forces of the elastically effective deformation members the forces are introduced into the plastically deformably effective deformation members whereby simultaneously an energy conversion takes place and the passenger cell is protected also in case of larger forces impinging on the bumper. In an advantageous construction of the inventive subject matter, the elastic deformation members may be constructed as leaf springs bent approximately ring-shaped either with opened or closed ring and may be connected with the bumper either directly or under interposition of further springs, especially of coil springs. Since no exact guidance of the bumper is possible with the use of coil springs and the bumper might possibly vibrate, it is appropriate if additional tensional and mounting means are provided between the bumper and the leaf springs or possibly between the bumper and the plastically deformably effective deformation members.

In an advantageous embodiment of the present invention, the plastically deformably effective deformation members may be constructed as impact or deformation pots and/or as deformable longitudinal girders connected with the passenger cell, whose resistance to deformation is larger than that of the impact pots. By the series-connection of the deformation members, it is therefore achieved advantageously that the deformation resistance increases from the bumper toward the passenger center cell and that relatively large accident energies are nearly completely converted along this long deformation path before a damage of the passenger center cell can take place. So called minor and medium damages of vehicles are thus avoided in an optimum manner.

In order to be able also to absorb forces impinging laterally on the vehicle, it is advantageous if the longitudinal girders are constructed offset or bent with respect to a horizontal and/or vertical longitudinal plane of the vehicle. The deformation members are appropriately connected with each other in a readily detachable manner and are connected over the entire length between the bumper and the passenger cell at least once by a cross girder or the like with the deformation members arranged symmetrically to the vehicle longitudinal center plane. The assembly is considerably facilitated thereby and additionally damaged impact pots and bent springs can be exchanged rapidly in a simple manner and can be replaced by new deformation members. The assembly of the bumper is also facilitated in that the bumper is constructed multi-partite, preferably of three parts and the connecting places coincide with at least a portion of the connecting places of the deformation members so that the connections between the bumper elements, the deformation members as well as an eventual cover element, for example, a rubber horn can be established with only a single bolt or the like. For the absorption of small impacts, for example, during the parking of the vehicle and for covering the connecting places between the individual elements of the bumper, a profile rail of rubber or plastic material may advantageously be provided which is arranged at the outer surface of the bumper.

Accordingly, it is an object of the present invention to provide a bumper for vehicles, especially for motor vehicles, which avoids by simple structural means the aforementioned shortcomings and drawbacks encountered in the prior art.

Another object of the present invention resides in a bumper which ensures satisfactory absorption and dissipation of larger impact forces in case of accidents yet is able to absorb small forces as occur during parking without damage to any of the vehicle parts or engine parts.

Another object of the present invention resides in a bumper structure for motor vehicles which consists of several parts that can be readily interchanged in case of damage.

Still another object of the present invention resides in a bumper structure for motor vehicles which is relatively simple in construction and easy to assemble.

Another object of the present invention resides in a bumper for vehicles, especially motor vehicles which is so constructed and arranged that it optimizes the absorption of the various types of forces in relation to the respective magnitudes thereof.

These and further objects, features and advantages of the present invention will become more apparent from the following description when taken in connection with the accompanying drawing which shows, for purposes of illustration only, several embodiments in accordance with the present invention and wherein.

FIGS. 5A and 5B are partial schematic plan views of two further modified embodiments of a bumper arrangement of symmetrical construction in accordance with the present invention; and FIGS. 6 – 8 are partial schematic plan views of a still further embodiment of a bumper arrangement in accordance with the present invention illustrating in FIGS. 7 and 8 thereof the action thereof under various impact forces.

Figure 1:
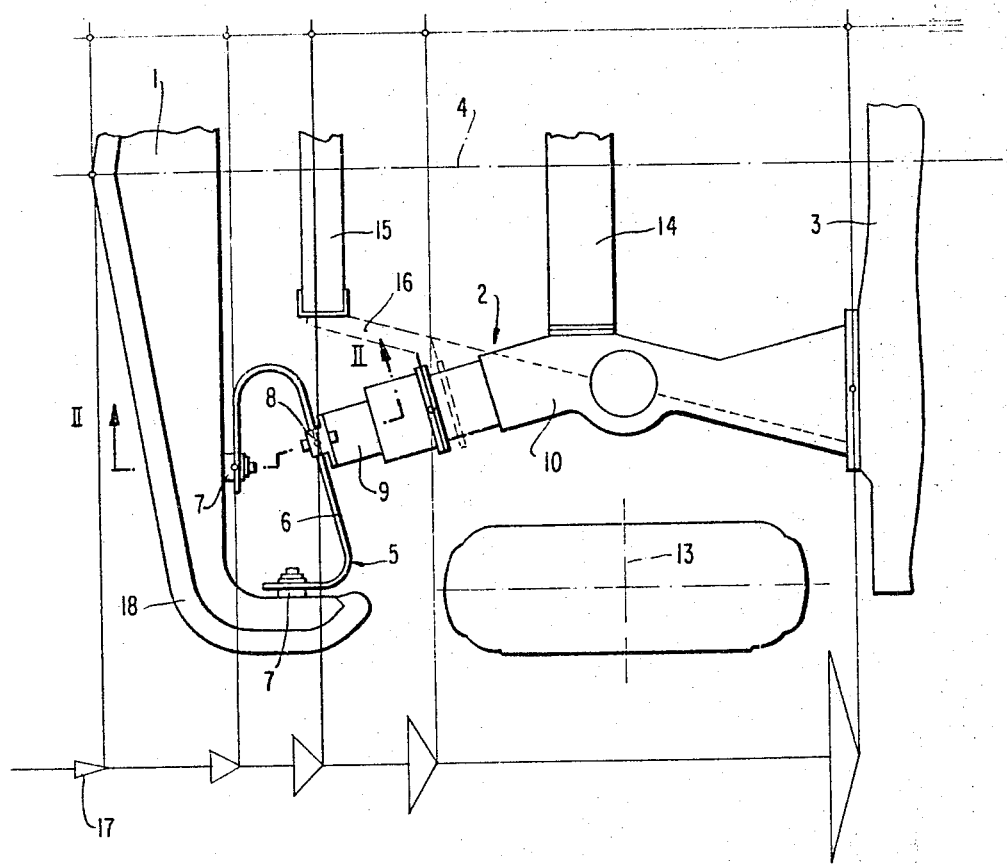
FIG. 1 is a partial schematic plan view of a bumper arrangement in accordance with the present invention.
Figure 2:
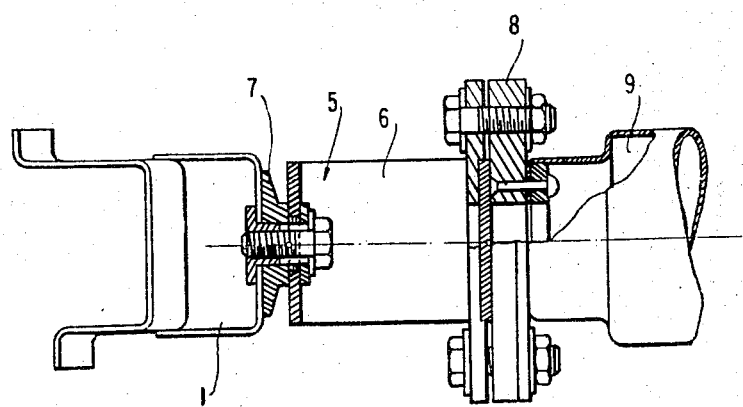
FIG. 2 is a cross-sectional view, on an enlarged scale, taken along line II—II of FIG. 1.

Referring now to the drawing wherein like reference numerals are used throughout the various views to designate like parts, and more particularly to FIG. 1, a bumper arrangement is schematically illustrated in plan view in this figure. The bumper 1 is supported by way of several deformation members generally designated by reference numeral 2 at the form-rigid passenger cell 3 of the motor vehicle of otherwise conventional construction. The deformation members 2 are thereby series-connected, i.e., one behind the other, and are provided in the same manner symmetrically to the vehicle longitudinal axis 4 on both sides at the respective vehicle end. The deformation members are composed of elastically effective and plastically deformably effective deformation members. The elastically acting deformation members generally designated by reference numeral 5 which in this embodiment are constituted by an upright, vertical leaf-spring 6, are secured by way of the connecting parts 7, 8, illustrated more fully in FIG. 2, at the bumper 1 and at the plastically deformably effective deformation members 9 and 10.

Figure 4:
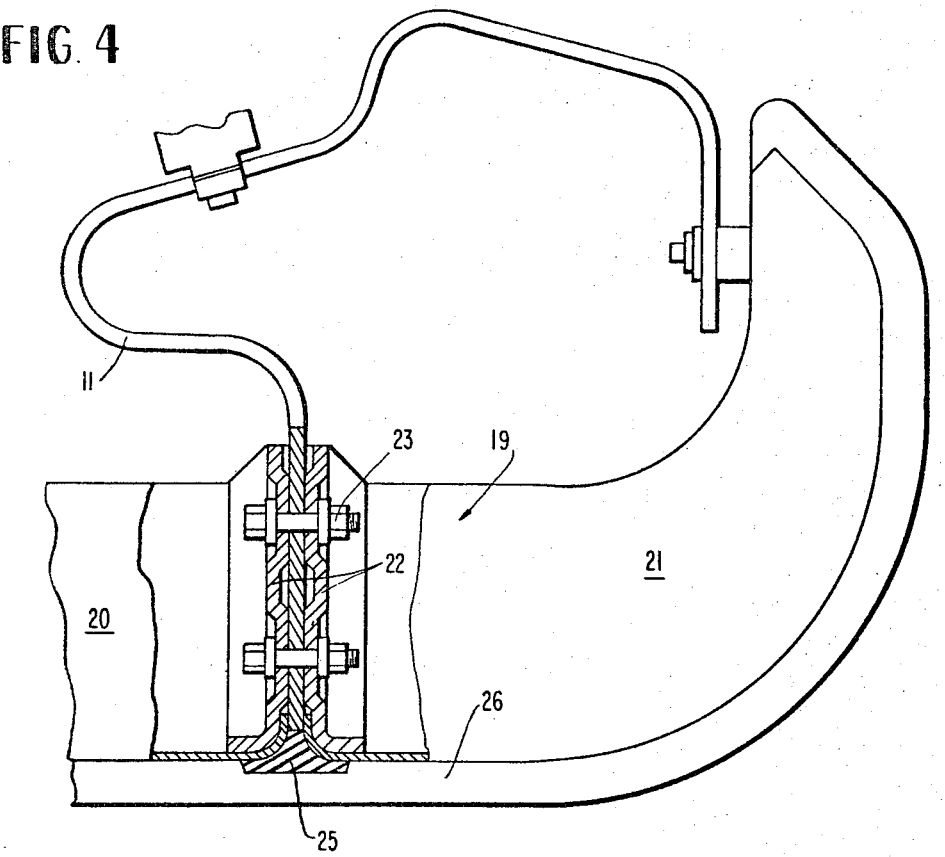
FIG. 4 is a plan view of the divided bumper arrangement of FIG. 3.

In the embodiments corresponding to FIGS. 1 and 4, the elastic deformation members 5 are constructed as approximately annularly shaped bent leaf-springs 6 and 11 with an open ring whereas the leaf-springs 12 illustrated in FIGS. 5A and 5B are of closed construction. The plastically deformably effective deformation members are constructed as impact pots 9 of any conventional construction (for example, as disclosed in U.S. Pat. No. 3,167,974) and as deformable longitudinal girders 10, connected with the passenger cell 3, whose deformation resistance is larger than that of the impact pots 9. The longitudinal girders 10 may also be angularly bent outwardly with respect to the vehicle longitudinal axis 4 for improving the capability to absorbe impacts laterally impinging on the vehicle. To faciltiate the assembly and to be able to readily interchange a damaged or deformed deformation member in case of a repair, the deformation members 5, 9, 10 are readily detachably connected with each other and more particularly by threaded and riveted connections as can be clearly seen from FIG. 2. The longitudinal girders 10, in their turn, are again detachably flangedly connected at the passenger cell 3. In proximity to the axial plane 13 the longitudinal girders 10 are connected with each other by a cross girder 14 whereby the stability of the bumper arrangement is considerably increased. The radiator 15 may be secured at the longitudinal girders 10, for example, by a plate or mounting 16 shown in dash lines.

It is schematically indicated in FIG. 1 by the arrows 17 which impact forces acting centrally on the bumper are absorbed by the individual deformation members. From the schematic representation of the arrow size can be seen that the deformation resistance, beginning at the rubber profile rail 18 of the bumper 1, increases by way of the deformation members 5, 9 and 10 and is largest at the form-rigid passenger cell 3.

Figure 3:
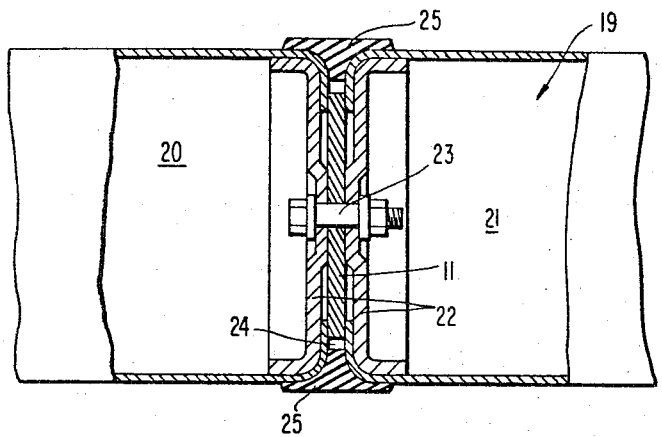
FIG. 3 is a partial cross-sectional view, on an enlarged scale, illustrating the arrangement of an elastic deformation member between the parts of a divided bumper in accordance with the present invention.

FIG. 3 illustrates a partial cross section through a bumper generally designated by reference numeral 19 which is constructed in a manner similar to the bumper 1 in FIG. 1. The portions 20 and 21 of the bumper 19 are flangedly connected to one another by the use of terminal walls 22 by means of bolts 23 and by the inclusion of the leaf-spring end of the leaf spring 11. The resulting gap 24 is sealed off by a rubber seal 25. The profile rail 26 (FIG. 4) of rubber or synthetic resinous material extends over the entire length of the bumper 19 and also covers the rubber gaskets 25.

Two further embodiments for a bumper arrangement are illustrated in FIGS. 5A, 5B and 6 – 8. The one-piece bumper 27 (FIGs. 5A and 5B) is supported at the form-rigid passenger cell 30 by way of the coil springs 28, leaf-springs 12 and bent longitudinal girders 29. The deformation members 28, 12 and 29 are detachably connected with each other. In order that the coil springs 28 are pre-stressed and a safe guidance of the bumper is assured thereby and the vibrations are not transmitted to the bumper, tie-rods generally designated by reference numerals 31 and 32 are provided in FIGS. 5A and 5B, respectively. Whereas the tie-rod 31 (FIG. 5A) consists of a cable 34 retained at a leg 33, the tie rod 32 (FIG. 5B) may be constructed in the form of chain links or chain members 35 of any known construction which are rigid in the vertical direction but are adapted to be bent in the horizontal direction. A drooping or hanging down of the bumper 27 caused by the gravity force can be avoided thereby. However, it is also possible to replace the coil springs 28 by conventional spring legs so that, on the one hand, larger forces can be absorbed, and, on the other, a better guidance of the bumper 27 at the leaf-springs 12 or directly at the deformation members 29 is possible. For purposes of increasing the rigidity of the base of the bumper support, the deformation members 29 are connected with each other by a cross girder 36, shown only in FIG. 5A, though a similar cross girder is provided in FIG. 5B.

In FIGS. 6 to 8 the corresponding parts are designated by the same reference numerals. The bumper 27 is supported at the support base of the longitudinal girder 29 by way of the coil spring 28 and of a scissor-like element generally designated by reference numeral 37. The scissor 37 consists of the two legs 38 and 39. The pivotal outer bumper part 42 is elastically supported by means of a shock absorber 40 at the leg 38 of the scissor 37 which is rotatably supported in the joint 41 of the bumper parts 27 and 42. The outer pivotal bumper part 42 can additionally be braked in its rotary movement by a torsion spring 43.

In FIGS. 7 and 8 two basic collision cases are illustrated, and more particularly in FIG. 7 in case of the influence of a force 44 from in front and in FIG. 8 in case of the influence of a force 45 obliquely from the side.

In FIGS. 6 to 8 the parts 46 represent abutment bumpers and the parts 47 open abutment pans.

While I have shown and described several embodiments in accordance with the present invention, it is understood that the same is not limited thereto but is susceptible of numerous changes and odifications as known to those skilled in the art and I, therefore, do not wish to be limited to the details shown and described herein but intended to cover all such changes and modifications as are encompassed by the scope of the appended claims.

What is claimed is:

1. A bumper arrangement for connecting at least one substantially form rigid bumper member to a substantially form rigid passenger cell of a passenger vehicle; said arrangement comprising:

elastically deformable connecting means and plastically deformable connecting means serially connected to one another, said elastically deformable connecting means being connected directly to one of said bumper member and passenger cell, said plastically deformable connecting means being connected directly to the elastically deformable connecting means at the side thereof closest to the other of said bumper member and passenger cell for transmitting forces between said elastically deformable connecting means and said other of said bumper means and passenger cell, wherein said bumper member is subjected in use to both axial and transverse collision forces with respect to an axially extending vehicle centerline, wherein said elastic connecting means is configured and positioned with respect to said bumper member and passenger cell for elastically cushioning the transfer of both said aixal and transverse collision forces between said bumper member and said passenger cell, and wherein said plastically deformable connecting means are angularly inclined with respect to a vehicle longitudinal center plane to accommodate plastic deformation absorption of both said axial and transverse collision forces between said bumper member and said passenger cell.

2. A bumper arrangement according to claim 1, characterized in that the elastically deformable means connecting include approximately annularly shaped leaf-spring means operatively connected with the bumper.

3. A bumper arrangement according to claim 2, characterized in that the leaf-spring means have an open ring.

4. A bumper arrangement according to claim 2, characterized in that the leaf-spring means have a closed ring.

5. A bumper arrangement according to claim 2, characterized in that the leaf-spring means are directly connected with the bumper.

6. A bumper arrangement according to claim 2, characterized in that the leaf-spring means are connected with the bumper by interposition of further spring means.

7. A bumper arrangement according to claim 6, characterized in that said further spring means are coil springs.

8. A bumper arrangement according to claim 2, characterized in that the plastically deformable connecting means include deformation pot means connected to the elastically deformable connecting means and deformable longitudinal girder means connected with the passenger cell, the deformation resistance of said longitudinal girder means being larger than that of the deformation pot means.

9. A bumper arrangement according to claim 8, characterized in that the longitudinal girder means are bent with respect to said vehicle longitudinal center plane to effect the angular inclination of said plastically deformable connecting means.

10. A bumper arrangement according to claim 9, characterized in that the vehicle longitudinal center plane is a horizontal vehicle longitudinal center plane.

11. A bumper arrangement according to claim 9, characterized in that the vehicle longitudinal center plane is a vertical vehicle longitudinal center plane.

12. A bumper arrangement according to claim 9, characterized in that the connecting means of each of said sets are readily detachably connected with each other and over the entire length between the bumper member and the passenger cell are connected with corresponding connecting means of the other set at least once by cross girder means.

13. A bumper arrangement according to claim 12, characterized in that the two sets of connecting means are arranged symmetrically to the vehicle longitudinal center plane.

14. A bumper arrangement according to claim 12, characterized in that the bumper assembly is of multipartite construction and the connecting places thereof coincide with at least a portion of the connecting places of the elastically deformable connecting means so that connections between the bumper parts and the elastically deformable connecting means are adapted to be established with only a single attaching means.

15. A bumper arrangement according to claim 14, wherein the attaching means is a bolt.

16. A bumper arrangement according to claim 14, characterized in that the single attaching means also establishes a connection for a cover element.

17. A bumper arrangement according to claim 14, characterized in that the bumper consists of three parts.

18. A bumper arrangement according to claim 14, characterized in that scissor means with limited spreading path are arranged at the longitudinal girder means for the exact guidance and mounting of the bumper.

19. A bumper arrangement according to claim 17, characterized in that the outer bumper parts are pivotally supported at the center bumper part.

20. A bumper arrangement according to claim 19, characterized in that the outer pivotally supported bumper part is connected at its pivotal support by means of a torsion spring.

21. A bumper arrangement according to claim 20, characterized in that the outer bumper part is supported by way of a shock absorber.

22. A bumper arrangement according to claim 17, characterized in that scissor means with limited spreading path are arranged at the longitudinal girder means for the exact guidance and mounting of the bumper.

23. A bumper arrangement according to claim 22, characterized in that the outer bumper part is supported by way of a shock absorber means at a leg of the scissor means.

24. A bumper arrangement according to claim 23, characterized in that the bumper is provided with a profile rail means made from rubber or plastic material which covers the connecting places.

25. An arrangement according to claim 1, wherein said bumper member extends substantially transversely of said vehicle centerline at one extreme longitudinal end of the vehicle, and wherein said passenger cell is spaced axially in the longitudinal direction from said bumper member.

26. An arrangement according to claim 25, wherein said elastically deformable connecting means is connected directly to said bumper member and said plastically deformable connecting means is connected directly to said passenger cell.

27. A bumper arrangement according to claim 26, characterized in that the elastically deformable means connecting include approximately annularly shaped leaf-spring means operatively connected with the bumper.

28. A bumper arrangement according to claim 27, characterized in that the leaf-spring means have an open ring.

29. A bumper arrangement according to claim 27, characterized in that the leaf-spring means have a closed ring.

30. A bumper arrangement according to claim 27, characterized in that the leaf-spring means are directly connected with the bumper.

31. A bumper arrangement according to claim 27, characterized in that the leaf-spring means are connected with the bumper by interposition of further spring means.

32. A bumper arrangement according to claim 31, characterized in that said further spring means are coil springs.

33. An arrangement according to claim 26, wherein said elastically deformable means includes spring means interposed between said bumper member and said plastically deformable means, said spring means including portions movable in respective transverse and axial directions in response to respective transverse and axial forces acting on said bumper member, whereby said bumper member can move against the elastic force of said spring means in both the axial and transverse directions.

34. An arrangement according to claim 33, wherein said spring means includes a leaf spring.

35. An arrangement according to claim 34, wherein said leaf spring is a vertical leaf spring with flat portions thereof extending vertically with respect to a horizontal plane through the vehicle.

36. An arrangement according to claim 34, wherein said leaf spring is connected in a middle portion thereof at the plastically deformable connecting means and at the respective opposite end portions thereof at said bumper member such that said leaf spring and the portion of the bumper member between the respective connections to the leaf spring form a closed loop.

37. An arrangement according to claim 36, wherein said leaf spring is a vertical leaf spring with flat portions thereof extending vertically with respect to a horizontal plane through the vehicle, and wherein said closed loop is disposed substantially horizontally.

38. An arrangement according to claim 37, wherein said plastically deformable connecting means includes a plurality of serially connected plastically deformable members.

39. An arrangement according to claim 38, wherein said plastically deformable members include a deformation pot member connected directly to said spring means and a deformable longitudinal girder connected between said pot member and said passenger cell.

40. An arrangement according to claim 39, wherein each of said deformable members are readily detachable with respect to one another and with respect to said respective spring means and passenger cell.

41. An arrangement according to claim 40, wherein two separate transversely spaced sets of similar respective serially connected elastically and plastically deformable means are provided for connecting a bumper assembly including said at least one bumper member to said passenger cell, the connection of the deformable longitudinal girder of one set at said passenger cell being transversely spaced from the corresponding connection of the deformable longitudinal girder of the other set at said passenger cell, and wherein cross girder means are provided which interconnect said respective deformable longitudinal girders to one another to assist in stabilizing the connection of the bumper assembly to the passenger cell.

42. An arrangement according to claim 26, wherein two separate transversely spaced sets of respective serially connected elastically and plastically deformable means are provided for connecting a bumper assembly including said at least one bumper member to said passenger cell, the connection of the plastically deformable means of one set at the passenger cell being spaced transversely from the corresponding connection of the plastically deformable means of the other set, and wherein cross girder means are provided for interconnecting said sets with one another to assist in stabilizing the connection of the bumper assembly to the passenger cell, said cross girder means being attached to the respective deformable connecting means at positions spaced from both the bumper assembly and the passenger cell.

43. A bumper arrangement according to claim 42, characterized in that the connecting means of each of said sets are readily detachably connected with each other and over the entire length between the bumper member and the passenger cell are connected with corresponding connecting means of the other set at least once by cross girder means.

44. A bumper arrangement according to claim 43, characterized in that the two sets of connection means are arranged symmetrically to the vehicle longitudinal center plane.

45. An arrangement according to claim 42, wherein said two sets are substantially similar and are positioned symmetrically to the axially extending vehicle centerline.

46. A bumper arrangement to claim 1, characterized in that the plastically deformable connecting means include deformation pot means connected to the elastically deformable connecting means and deformable longitudinal girder means connected with the passenger cell, the deformation resistance of said longitudinal girder means being larger than that of the deformation pot means.

47. A bumper arrangement according to claim 46, characterized in that the longitudinal girder means are bent with respect to said vehicle longitudinal center plane to effect the angular inclination of said plastically deformable connecting means.

48. A bumper arrangement according to claim 46, characterized in that scissor means with limited spreading path are arranged at the longitudinal girder means for the exact guidance and mounting of the bumper.

49. An arrangement according to claim 1, wherein a plurality of interconnected bumper members make up a bumper assembly, wherein the connecting places between said respective bumper members coincide with at least a portion of the connecting places of the deformable connecting means and the bumper members so that connections between the bumper parts and the deformable connecting means are established with only a single attaching means.

50. A bumper arrangement according to claim 49, characterized in that the single attaching means also establishes a connection for a cover element.

51. A bumper arrangement according to claim 49, characterized in that the bumper consists of three parts.

52. A bumper arrangement according to claim 51, characterized in that the outer bumper parts are pivotally supported at the center bumper part.

53. A bumper arrangement according to claim 52, characterized in that the outer pivotally supported bumper part is connected at its pivotal support by means of a torsion spring.

54. A bumper arrangement according to claim 51, characterized in that the outer bumper part is supported by way of a shock absorber.

55. A bumper arrangement according to claim 51, characterized in that the outer bumper part is supported by way of a shock absorber means at a leg of a scissor means.

56. A bumper arrangement according to claim 51, characterized in that the bumper is provided with a profile rail means made from rubber or plastic material which covers the connecting places.

57. An arrangement according to claim 1, wherein said plastically deformable connecting means includes a plurality of serially connected plastically deformable members.

58. An arrangement according to claim 57, wherein said plastically deformable members include a deformation pot member connected directly to said spring means and a deformable longitudinal girder connected between said pot member and said passenger cell.

59. An arrangement according to claim 57, wherein each of said deformable members are readily detachable with respect to one another and with respect to said respective spring means and passenger cell.

60. An arrangement according to claim 58, wherein two separate transversely spaced sets of similar respective serially connected elastically and plastically deformable means are provided for connecting a bumper assembly including said at least one bumper member to said passenger cell, the connection of the deformable longitudinal girder of one set at said passenger cell being transversely spaced from the corresponding connection of the deformable longitudinal girder of the other set at said passenger cell, and wherein cross girder means are provided which interconnect said respective deformable longitudinal girders to one another to assist in stablizing the connection of the bumper assembly to the passenger cell.

61. An arrangement according to claim 60, wherein said two sets are substantially similar and are positioned symmetrically to the axially extending vehicle centerline.

62. A bumper arrangement for connecting at least one substantially form rigid bumper member to a substantially form rigid passenger cell of a passenger vehicle; said arrangement comprising:
elastically deformable connecting means and plastically deformable connecting means serially connected to one another, said elastically deformable connecting means being connected directly to one of said bumper member and passenger cell, said plastically deformable connecting means being connected directly to the other of said bumper member and passenger cell, wherein said bumper member is subjected in use to both axial and transverse collision forces with respect to an axially extending vehicle centerline, wherein said elastic connecting means is configured and positioned with respect to said bumper member and passenger cell for elastically cushioning the transfer of both said axial and transverse collision forces between said bumper member and said passenger cell, wherein said bumper member extends substantially transversely of said vehicle centerline at one extreme longitudinal end of the vehicle, and wherein said passenger cell is spaced axially in the longitudinal direction from said bumper member, wherein said elastically deformable connecting means is connected directly to said bumper member and said plastically deformable connecting means is connected directly to said passenger cell, wherein said elastically deformable means includes spring means interposed between said bumper member and said plastically deformable means, said spring means including portions movable in respective transverse and axial directions in response to respective transverse and axial forces acting on said bumper member, wherby said bumper member can move against the elastic force of said spring means in both the axial and transverse directions, wherein said plastically deformable connecting means includes a plurality of serially connected plastically deformable members, wherein said plastically deformable members include a deformation pot member connected directly to said spring means and a deformable longitudinal girder connected between said pot member and said passenger cell, wherein each of said deformable members are readily detachable with respect to one another and with respect to said respective spring means and passenger cell, wherein two separate transversely spaced sets of similar respective serially connected elastically and plastically deformable means are provided for connecting a bumper assembly including said at least one bumper member to said passenger cell, the connection of the deformable longitudinal girder of one set at said passenger cell being transversely spaced from the corresponding connection of the deformable longitudinal girder of the other set at said passenger cell, and wherein cross girder means are provided which interconnect said respective deformable longitudinal girders to one another to assist in stabilizing the connection of the bumper assembly to the passenger cell, and wherein said two sets are substantially similar and are positioned symmetrically to the axially extending vehicle centerline.

\* \* \* \* \*